(12) United States Patent
Larsen

(10) Patent No.: US 11,836,986 B2
(45) Date of Patent: Dec. 5, 2023

(54) METHOD FOR OBSTACLE IDENTIFICATION

(71) Applicant: IEE INTERNATIONAL ELECTRONICS & ENGINEERING S.A., Echternach (LU)

(72) Inventor: Peter Larsen, Bereldange (LU)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 668 days.

(21) Appl. No.: 17/044,572

(22) PCT Filed: Apr. 2, 2019

(86) PCT No.: PCT/EP2019/058307
§ 371 (c)(1),
(2) Date: Oct. 1, 2020

(87) PCT Pub. No.: WO2019/193009
PCT Pub. Date: Oct. 10, 2019

(65) Prior Publication Data
US 2021/0097312 A1 Apr. 1, 2021

(30) Foreign Application Priority Data

Apr. 3, 2018 (LU) .................... LU100761

(51) Int. Cl.
*G06V 20/58* (2022.01)
*G06T 7/70* (2017.01)
(Continued)

(52) U.S. Cl.
CPC ............ *G06V 20/58* (2022.01); *G01S 13/867* (2013.01); *G01S 13/931* (2013.01); *G06T 7/70* (2017.01);
(Continued)

(58) Field of Classification Search
CPC ...... G06V 20/58; G06V 40/10; G01S 13/867; G01S 13/931; G01S 2013/9318;
(Continued)

(56) References Cited

U.S. PATENT DOCUMENTS 10,025,997 B2   7/2018  Han et al.
10,031,225 B2   7/2018  Staynov
(Continued)

FOREIGN PATENT DOCUMENTS

CN    108028017 A     5/2018
DE   102015209112 A1  11/2015
(Continued)

OTHER PUBLICATIONS

English Translation of Chinese Office Action for CN Application No. 2019800241225.
(Continued)

*Primary Examiner* — Charlotte M Baker
(74) *Attorney, Agent, or Firm* — REISING ETHINGTON P.C.

(57) ABSTRACT

A method for obstacle identification for a vehicle. In order to provide means for reliable obstacle identification for a vehicle, the method includes: performing a first obstacle search with a radar sensor using a radio frequency signal; performing a second obstacle search with a night vision camera; and identifying an obstacle if a first detection of the first obstacle search corresponds to a second detection of the second obstacle search, wherein a reliability of the first detection is assessed and if the reliability is above a first threshold, the obstacle is identified independently of the second obstacle search.

12 Claims, 2 Drawing Sheets

(51) Int. Cl.
*G01S 13/86* (2006.01)
*G01S 13/931* (2020.01)

(52) U.S. Cl.
CPC ............. *G01S 2013/9318* (2020.01); *G01S 2013/93185* (2020.01); *G06T 2207/30261* (2013.01)

(58) Field of Classification Search
CPC ............ G01S 2013/93185; G06T 7/70; G06T 2207/30261
USPC ........................................... 382/103
See application file for complete search history.

(56) References Cited

U.S. PATENT DOCUMENTS

| | | | | |
|---|---|---|---|---|
| 10,284,822 | B2* | 5/2019 | Murar | H04N 7/183 |
| 2010/0217527 | A1 | 8/2010 | Hattori et al. | |
| 2012/0293357 | A1 | 11/2012 | Nishigaki et al. | |
| 2015/0338516 | A1 | 11/2015 | Kijima et al. | |
| 2018/0090008 | A1 | 3/2018 | Ikenouchi et al. | |

FOREIGN PATENT DOCUMENTS

| | | |
|---|---|---|
| DE | 102015106092 A1 | 10/2016 |
| DE | 102016114160 A1 | 2/2018 |
| DE | 102017122479 A1 | 3/2018 |
| EP | 2506234 A1 | 10/2012 |
| KR | 20160123668 A | 10/2016 |
| WO | 2018024585 A1 | 2/2018 |
| WO | WO2019193009 A1 | 10/2019 |

OTHER PUBLICATIONS

International Search Report corresponding to International Application No. PCT/EP2019/058307, dated Jul. 2, 2019, 4 pages.
Written Opinion corresponding to International Application No. PCT/EP2019/058307, dated Jul. 2, 2019, 6 pages.

* cited by examiner

METHOD FOR OBSTACLE IDENTIFICATION

TECHNICAL FIELD

The invention relates to a method for obstacle identification. The invention further relates to a system for obstacle identification.

BACKGROUND

In modern vehicles, advanced sensor systems are commonly used to identify potential dangers and either provide a warning to the driver or autonomously take action to avoid or minimize any danger for the driver and the vehicle. One important aspect is obstacle identification, i.e. to identify any object that the vehicle could collide with. This refers to stationary objects as well as to mobile objects like cars, motorcycles, pedestrians and animals. Some of these objects can usually be reliably detected using radar sensors. Other objects, e.g. pedestrians or animals, often have a weak radar signature, which can make them difficult to identify. Failure to identify an obstacle could lead to an accident with considerable material and/or personal damage. On the other hand, any false identifications can seriously impair the normal operation of the vehicle, in particular if a system is triggered that autonomously takes control of the vehicle, e.g. by preventing a lane change or by braking automatically. Erroneous identification of an obstacle can be annoying for the driver, eventually making him deactivate safety systems, or lead to unnecessary emergency actions (braking, evasive maneuvers) that endanger the vehicle and/or other road users.

SUMMARY

It is thus an object of the present invention to provide reliable means for obstacle identification for a vehicle.

This problem can be solved by a method and a system according to the claims.

In at least some embodiments, the invention provides a method for obstacle identification in a vehicle. The term "vehicle" in this context in particular refers to a motorized road vehicle, like a passenger car or a truck. At least to some extent, the invention may be applicable to other vehicles like motorcycles or trains. "Obstacle identification" refers to identifying any object that the vehicle could collide with (or that could collide with the vehicle). It does not necessarily imply that the object is identified as belonging to a specific group of objects.

In a first step of the method, a first obstacle search is performed with a radar sensor using a radio frequency signal. The radar sensor may comprise one or a plurality of transmitter antennas as well as one or a plurality of receiver antennas. Each antenna may be employed as a transmitter antenna and as a receiver antenna. The radar sensor transmits a radar signal, which could be a continuous wave or a pulse signal, and receives a reflected signal. The transmitted signal is used as to search for obstacles. If an obstacle is within an area covered by the transmitted signal, it influences the reflected signal and therefore it can be detected by analysis of the reflected signal. As should be understood by the term "radar", the radar sensor uses a radio frequency signal, i.e. the transmitted signal as well as the reflected signal are radio frequency signals having at least one radio frequency. This at least one radio frequency can be at maximum 300 GHz, corresponding to a wavelength of at least 1 mm, or at maximum 100 GHz. In other words, the term "radio" in this context also includes electromagnetic waves that are also referred to as "microwaves". A lower frequency boundary for the at least one frequency can be e.g. 1 GHz or 10 GHz.

In second step, which may be performed before, after or simultaneously with the first step, a second obstacle search is performed with a night vision camera. The night vision camera is adapted for operation at low light levels. It may use amplification of the visible light, detection of (near) IR light or a combination of both to generate an image. Normally, it is a passive camera, although the night vision camera may include its own IR light source to illuminate a certain area. While the night vision camera is adapted for operation at night, it is also capable of operation during daytime, i.e. at higher light levels. It should be noted that while reference is made to an "image" or an "image frame", the image is normally not displayed for a user (e.g. the driver of the vehicle), but this rather refers to an image signal or image data corresponding to an image. By image recognition, one or several objects can be identified within the image. This image recognition is the basis of the second obstacle search. Every object detected or, normally, every object fulfilling certain criteria can be regarded as a potential obstacle.

In a third step, an obstacle is identified if a first detection of the first obstacle search corresponds to a second detection of the second obstacle search. A first detection of the first obstacle search corresponds to a reflected signal that is associated with a (potential) obstacle. The first detection can be based on an amplitude of the reflected signal and optionally other parameters like frequency, phase, waveform etc. If the reflected signal fulfils certain criteria, this is regarded as a first detection. A second detection of the second obstacle search corresponds to a (potential) obstacle being identified within an image frame recorded by the night vision camera. An obstacle is identified if the first detection corresponds to the second detection. In other words, the obstacle is identified if, according to certain predefined criteria, the first detection and the second detection can be attributed to the same object. These criteria may be more or less refined. In the most simple case, the first detection and the second detection are regarded as corresponding to each other if they occur within a certain small time interval, i.e. (almost) simultaneously. It is understood that the radar sensor and the night vision camera need to have a common detection area in which an obstacle can be detected by the radar and by the night vision camera. Beside this common detection area, the radar sensor may have a detection area that is not covered by the night vision camera and vice versa.

An advantage of the disclosed method and system is that they each combine two different search and detection techniques in order to identify any actual obstacle with a high reliability while avoiding false detections, even under reduced light levels. While it would be possible to reduce false detections by decreasing the sensitivity (or increase the detection threshold) of a single detection method, this would also increase the risk of actual obstacles not being detected. On the other hand, while it would be possible to increase the sensitivity (or decrease the detection threshold) of a single detection method in order to assure detection of any actual obstacle, this would also lead to an increased number of false detections. With the inventive method, both radar detection and night vision detection may operate with a rather low detection threshold, but false detections are avoided or at least greatly reduced because each of the first and second detection has to be confirmed or verified by the other detection before an obstacle is identified.

As mentioned above, by combining two independent detections, false detections can be avoided even if each of the first and the second detection alone has a considerable risk of a false detection. However, in some cases the first detection alone may be sufficiently clear that there is no need for a verification by the second detection. Therefore, a reliability of the first detection is assessed and if the reliability is above a first threshold, the obstacle is identified independently of the second obstacle search. The reliability may e.g. depend on the amplitude of the reflected radar signal. If the amplitude is rather high, the reliability can be considered as high and therefore the obstacle can be identified independently of the second obstacle search. "Independently of the second obstacle search" means that the second obstacle search may not be performed at all or it may be performed but its result is not taken into account. If the reliability is low, on the other hand, this could indicate e.g. a small obstacle (or, strictly speaking, an obstacle with a reduced radar cross-section) or it could indicate that there is no obstacle at all. In order to determine which is the case, it makes sense to perform the second obstacle search and to take its result (i.e. the second detection) into account. The reliability can be assessed before the second obstacle search is performed. Also, as mentioned above, one option is that the second obstacle search is only performed if the reliability is below (or equal to) the first threshold. Strictly speaking, the second obstacle search is performed at least if the reliability is below the first threshold.

According to one embodiment, the first and the second obstacle search are performed for a forward area in front of the vehicle. "In front of the vehicle" refers to the normal driving direction of the vehicle. This may in particular be relevant for avoiding accidents with pedestrians, animals or stationary obstacles. Additionally or alternatively, the first and second obstacle search can be performed for a backward area behind the vehicle. On the one hand, this can be relevant if the vehicle is driving backwards. On the other hand, it can be relevant if another vehicle, e.g. a car or a motorcycle, is approaching from behind and could be expected to overtake the vehicle. In such a case, a lane change of the vehicle could lead to a collision with the overtaking vehicle. It is understood that if both the forward area of the backward area need to be covered, usually a dedicated radar sensor and a dedicated night vision camera are necessary for each area.

Usually any object that does not have a significant relative speed with respect to the vehicle does not pose a danger and therefore may be not regarded as an obstacle. In a preferred embodiment, the first detection includes detecting an object approach speed and if the object approach speed is below a second threshold, the first detection is disregarded, independently of the second obstacle search. The object approach speed is the speed at which the object detected by the first detection approaches the vehicle, wherein this approach speed can be zero or even negative if the object is moving away (or the vehicle moves away from the object). If the object approach speed is below a second threshold, this may be regarded as an indication that there is at least no immediate collision danger, wherefore it is unnecessary to verify the first detection by the second detection. Therefore, the first detection can be disregarded and the second search may not be performed at all or its result may be not taken into account. In this embodiment and the previously described embodiment, not taking into account the second search or even not performing the second search may be a measure to save processing resources and improve the overall performance of the method. It should be noted, that the "approach speed" may be interpreted as a vector, which enables to assess, whether an object is predicted to collide or not. If the object is predicted to collide, an action may be taken in order to prevent the collision.

Also, it can make a difference whether the object is approaching the vehicle from ahead or from behind. For instance, another vehicle approaching slowly from behind could be disregarded as it can be expected to either slow down before a collision or to overtake the vehicle. On the other hand, if another vehicle is approaching from ahead (or rather, the vehicle approaches another vehicle ahead), the driver of the vehicle or some safety system needs to avoid the collision. Therefore, the second threshold may be determined dependent on whether the first and the second obstacle search are performed for the forward area or for the backward area.

Whether or not the first detection corresponds to the second detection can be determined based on various criteria. According to one embodiment, a potential obstacle position is determined based on the first detection. This potential obstacle position is in general a 3D position or at least a 2D position on a plane around the vehicle. It can be characterized e.g. by a one-dimensional or two-dimensional angle with respect to the longitudinal axis of the vehicle and by a distance. When this potential obstacle position is determined, an image area corresponding to the potential obstacle position is determined within an image frame recorded by the camera. As mentioned above, the image frame does not have to be displayed anywhere. With the position and the optical characteristics of the night vision camera known, it is possible to determine an image area that corresponds to the potential obstacle position. The image area corresponds to at least one pixel, normally to a plurality of pixels. Next, an obstacle is identified if an image corresponding to an obstacle is detected within the image area. In this context, the image may only partially be located within the image area. In other words, image recognition is performed for the image frame and the obstacle is identified if an image corresponding to an obstacle is detected and the image is located (at least partially) in the image area corresponding to the potential obstacle position. The image area may have various shapes, e.g. rectangular or ellipsoidal. Also, its size may be chosen differently, e.g. to account for an expected size of the image within the image frame or an uncertainty of the potential obstacle position. For example, the image area may be bigger if the potential obstacle position is closer and/or if there is a higher degree of uncertainty in the potential obstacle position. While herein reference is made to "an" image frame, it is understood that several (normally consecutive) image frames may be used.

In some embodiments, the second obstacle search may be performed locally at the image area. "At the image area" refers to the image area itself and optionally its vicinity. In other words, image recognition is not performed for the entire image frame, but only for the image area itself and possibly an area around it. This approach makes sense since any second detection in a region remote from the image area would be disregarded anyway and not be considered as a confirmation of the first detection. Therefore, the processing time may be reduced by restricting the second obstacle search in the way described above.

In general, the second obstacle search could search for any distinct objects of a certain size, regardless of their type. It is preferred, though, that an object classification is performed based on the image frame recorded by the camera.

In other words, an object is not only detected but also classified, i.e. categorized. Object classes could include pedestrian, animal, car, motorcycle and other. This classification may help to assess a potential danger associated with the object and to determine any safety measures that may be taken to avoid a collision. For example, an animal can be expected to change its direction in an unpredictable way at a greater speed than e.g. a pedestrian, wherefore special safety precautions can be necessary if the object is classified as an animal.

Furthermore, the second detection can be based on the object classification. In other words, an object may be detected but classified as harmless, wherefore it is disregarded and does not lead to a second detection. One example could be floating leaves or a bird flying over the road. These could lead to a first detection by the radar sensor and could also be identified within image frame, but may not be regarded as obstacles that can or need to be avoided.

It is preferred that, if an obstacle is identified, at least one safety system is activated. The safety system may either provide support for a certain operation of the vehicle by the driver (e.g. steering, braking or the like) or it may autonomously perform some action. However, if it is determined that a collision with the obstacle is likely or inevitable, the safety system that is activated may be a protection system like a belt tensioner, an airbag or the like. Alternatively or additionally, some kind of visible or audible signal for the driver of the vehicle may be activated.

In particular, an autonomous emergency braking (AEB) system or a lane keeping assist system (LKAS) can be activated. The AEB system is normally activated if an obstacle in front of the vehicle is identified. This braking system performs a braking action, optionally combined with a steering action, without the need for any action by the driver. The LKAS may be activated e.g. if an object is approaching the vehicle from the rear at a certain speed so that an overtaking maneuver can be expected. In such a situation, the LKAS can actively prevent the vehicle from changing lanes in order to avoid a collision. Alternatively or concurrently, an active steering system may autonomously perform an evasive maneuver, if appropriate and possible and if deemed necessary.

The invention further provides a system for obstacle identification for a vehicle, which system at least comprises a radar sensor and a night vision camera. The system is configured to perform a first obstacle search with the radar sensor using a radio frequency signal, to perform a second obstacle search with the night vision camera and to identify an obstacle if a first detection of the first obstacle search corresponds to a second detection of the second obstacle search. The system is further configured to assess a reliability of the first detection and, if the reliability is above a first threshold, identify the obstacle independently of the second obstacle search. All these terms have been already mentioned above with respect to the inventive method and therefore will not be explained again. The system preferably comprises a control unit that is coupled to the radar sensor and the night vision camera. The control unit is configured to operate the radar sensor during the first obstacle search and the night vision camera during the second obstacle search. Further, the control unit is configured to perform the first detection and the second detection and to identify an obstacle. The control unit may comprise several spaced apart components that communicate wirelessly or by wire. At least some functions of the control unit may be software-implemented. Preferred embodiments of the inventive system may correspond to those of the inventive method. The control unit may be adapted to perform the respective method steps.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 1:
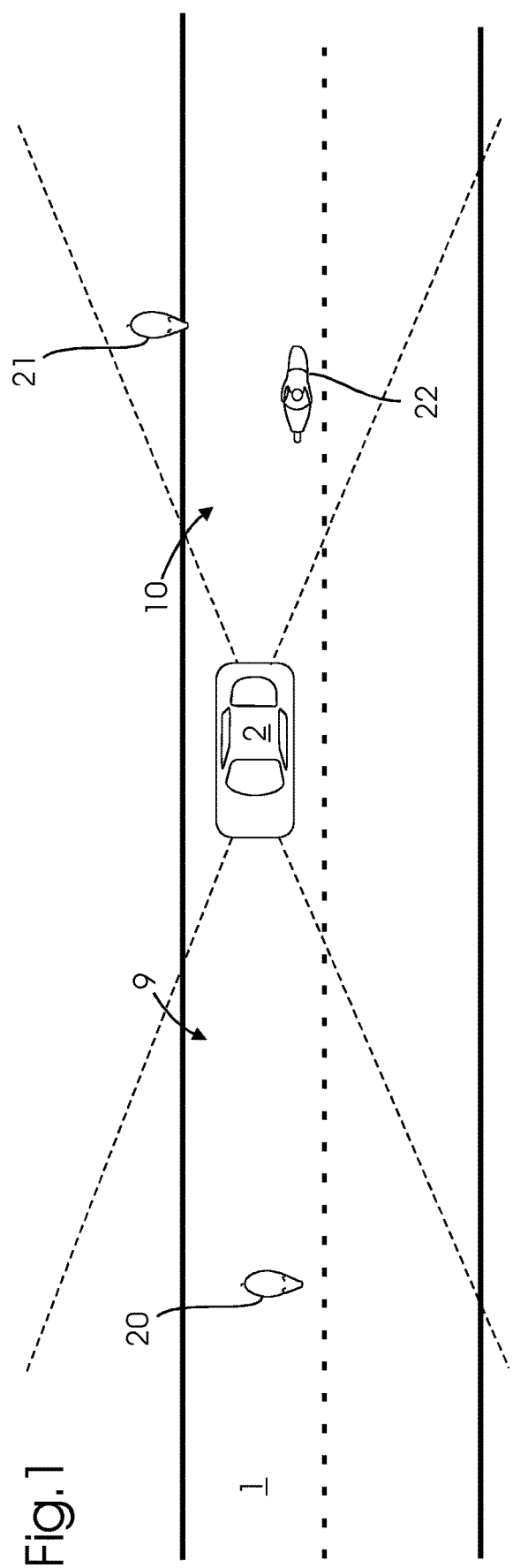
FIG. 1 is a schematic top view of a road, a vehicle having an inventive system for obstacle identification and several obstacles.
Figure 2:
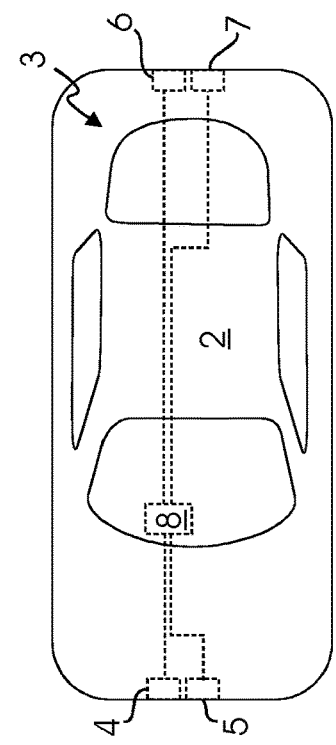
FIG. 2 is a schematic top view of the vehicle of FIG. 1.
Figure 4:
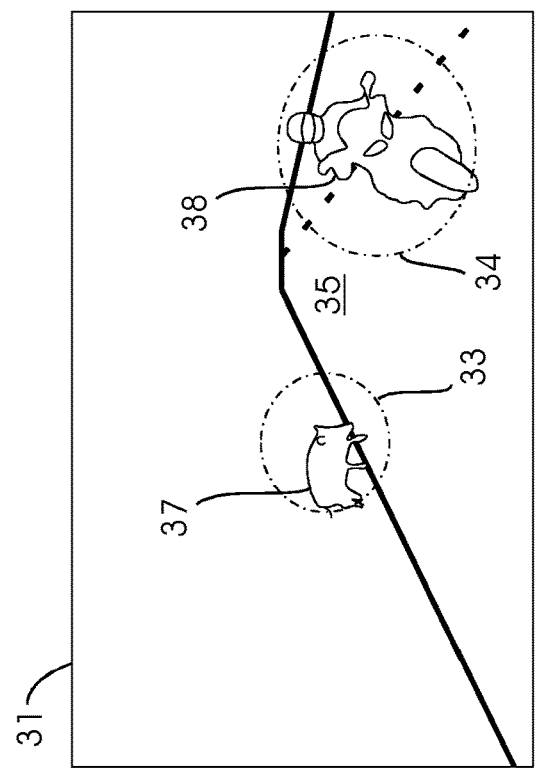
FIG. 4 is a schematic view of a second image frame.

FIG. 1 schematically shows a top view of a road one with a vehicle to, e.g. a passenger car that comprises an inventive system 3 for obstacle identification, which is adapted to perform an inventive method. The vehicle 2 is shown separately in FIG. 2. The system 3 comprises a front radar sensor 4, a front night vision camera 5, a rear radar sensor 6 and a rear night vision camera 7. The front radar sensor 4 and the front night vision camera 5 cover a forward area 9 in front of the vehicle 2. In general, the coverage of the front radar sensor 4 an the night vision camera 5 may differ to some extent, but for sake of simplicity, a single forward area 9 is shown. In a similar way, the rear radar sensor 6 and the rear night vision camera 7 cover a backward area 10 behind the vehicle 2. Each of the radar sensors 4, 6 is adapted to transmit a radar signal into the respective area 9, 10 and to receive a reflected signal from any object 20, 21, 22 within a certain range. Each of the night vision cameras 5, 7 is adapted to record optical data corresponding to a sequence of image frames 30, 31, with each of the night vision cameras 5, 7 being adapted for operation at daylight as well as at low light levels. The radar sensors 4, 6 and the night vision cameras 5, 7 are connected to a control unit 8.

Figure 3:
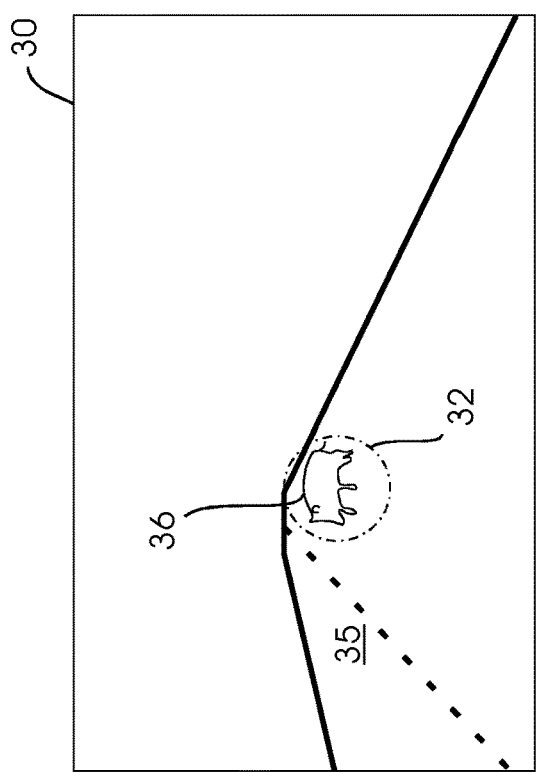
FIG. 3 is a schematic view of a first image frame.

During operation, the control unit 8 can activate the front radar sensor 4 to perform a first obstacle search within the forward area 9, i.e. the front radar sensor 4 transmits a radar signal and receives a reflected signal e.g. from a first wild boar 20 crossing the road 1 within the forward area 9, which leads to a first detection. By analysis of the reflected signal, a 3D position as well as an object approach speed of the wild boar 20 can be determined. Depending on the characteristics of the reflected signal, the wild boar 20 could be immediately be identified as an obstacle. However, if the radar cross-section of the wild boar 20 is rather low, a reliability of the first detection may be assessed to be below a first threshold. Under these circumstances, the control unit 8 uses the front night vision camera 5 to perform a second obstacle search within the forward area 9. In other words, image data corresponding to a first image frame 30 (shown in FIG. 3) are processed by image recognition, e.g. by the control unit 8 itself. If the reliability of the first detection is above the first threshold, the second obstacle search could be omitted or it could be performed but the wild boar 20 would be identified as an obstacle independently of the second obstacle search.

Since the position and optical characteristics of the front night vision camera 5 are known, a first image area 32 can be determined that corresponds to the 3D position of the wild boar 20. In this example, the first image area is circular, but it could also be e.g. rectangular. Apart from an image 35 of the road 1, an image 36 of the wild boar 20 can be seen, which can be identified by image recognition, leading to a second detection. Optionally, the second obstacle search, i.e. the image recognition process, may be performed only for the first image area 32 and its vicinity. Since the image 36 is located within the first image area 32, the second detection corresponds to the first detection. Also, the object approach speed corresponds more or less to the speed of the vehicle 2 and is therefore above a second predefined threshold. Therefore, the wild boar 20 is detected as an obstacle and the control unit 8 activates a safety system, e.g. an AEB system that autonomously brakes the vehicle 2 to avoid a collision. Optionally, an object classification can be performed which identifies the wild boar 20 as an animal, wherefore fast and unpredictable movements can be expected, in contrast to e.g. a pedestrian.

The control unit 8 operates the rear radar sensor 6 and the rear night vision camera 7 in a similar way to perform a first obstacle search and a second obstacle search for the backward area 10. In the backward area 10 there is a second wild boar 21 and a motorcycle 22, which approaches the vehicle 2 from behind and is about to overtake. After the first obstacle search by the rear radar sensor 6, a second image area 33 and a third image area 34 can be determined within a second image frame 31 recorded by the rear night vision camera 7. However, the second image area 33, which corresponds to a 3D position of the second wild boar 21, may optionally not be determined, because the object approach speed of the second wild boar 21 is negative and therefore below the second threshold. The object approach speed of the motorcycle 22, however, is above the second threshold. Optionally, the second threshold may depend on the distance of the detected object as well as on whether the first obstacle search is performed for the forward area 9 or for the backward area 10. By the second obstacle search, an image 38 of the motorcycle 22 is found within the third image area 34 (plus, optionally, an image 37 of the second wild boar 21 within the second image area 33), leading to a second detection that corresponds to the first detection. Therefore, the motorcycle 22 is identified as an obstacle. Again, an object classification may be performed to identify the motorcycle 22 as such. As the motorcycle 22 has been identified, the control unit 8 may activate and LKAS system that prevents the vehicle to from changing lanes until the motorcycle 22 has overtaken it.

The invention claimed is:

1. A method for obstacle identification for a vehicle, comprising:
performing a first obstacle search with a radar sensor using a radio frequency signal;
performing a second obstacle search with a night vision camera; and
identifying an obstacle if a first detection of the first obstacle search corresponds to a second detection of the second obstacle search, wherein a reliability of the first detection is assessed and if the reliability is above a first threshold, the obstacle is identified independently of the second obstacle search.

2. A method according to claim 1, wherein the first and the second obstacle search are performed for a forward area in front of the vehicle and/or for a backward area behind the vehicle.

3. A method according to claim 1, wherein the first detection includes detecting an object approach speed and if the object approach speed is below a second threshold, the first detection is disregarded, independently of the second obstacle search.

4. A method according to claim 3, wherein the second threshold is determined dependent on an object distance.

5. A method according to claim 3, wherein the second threshold is determined dependent on whether the first and the second obstacle search are performed for the forward area or for the backward area.

6. A method according to claim 1, wherein:
based on the first detection, a potential obstacle position is determined;
within an image frame recorded by the camera, an image area corresponding to the potential obstacle position is determined; and
an obstacle is identified if an image corresponding to an obstacle is detected within the image area.

7. A method according to claim 6, wherein the second obstacle search is performed locally at the image area.

8. A method according to claim 1, wherein based on the image frame recorded by the camera, an object classification is performed.

9. A method according to claim 8, wherein the second detection is based on the object classification.

10. A method according to claim 1, wherein if an obstacle is identified, at least one safety system is activated.

11. A method according to claim 1, wherein an autonomous emergency braking system or a lane keeping assist system is activated.

12. A system for obstacle identification for a vehicle, which system at least comprises a radar sensor and a night vision camera and is configured to:
perform a first obstacle search with the radar sensor using a radio frequency signal;
perform a second obstacle search with the night vision camera;
identify an obstacle if a first detection of the first obstacle search corresponds to a second detection of the second obstacle search; and
assess a reliability of the first detection and, if the reliability is above a first threshold, identify the obstacle independently of the second obstacle search.

* * * * *